United States Patent
Jarnikov

(10) Patent No.: US 9,288,057 B2
(45) Date of Patent: Mar. 15, 2016

(54) CONTENT SEGMENTATION OF WATERMARKING

(75) Inventor: Dmitri Jarnikov, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 100 days.

(21) Appl. No.: 14/008,397

(22) PCT Filed: Mar. 29, 2011

(86) PCT No.: PCT/EP2011/054828
§ 371 (c)(1),
(2), (4) Date: Sep. 27, 2013

(87) PCT Pub. No.: WO2012/130287
PCT Pub. Date: Oct. 4, 2012

(65) Prior Publication Data
US 2014/0019767 A1    Jan. 16, 2014

(51) Int. Cl.
*H04L 9/32* (2006.01)
*G06T 1/00* (2006.01)
*H04N 5/913* (2006.01)
(Continued)

(52) U.S. Cl.
CPC ............ *H04L 9/3247* (2013.01); *G06T 1/0071* (2013.01); *H04N 5/913* (2013.01); *H04N 19/154* (2014.11); *H04N 19/467* (2014.11); *H04N 21/23439* (2013.01); *H04N 21/23892* (2013.01); *H04N 21/44008* (2013.01); *H04N 21/8358* (2013.01); *H04N 21/8456* (2013.01); *H04N 2005/91335* (2013.01)

(58) Field of Classification Search
CPC .............. H04N 21/23892; H04N 2005/91335; H04N 1/32144; H04N 21/8358; G06T 1/0071; G06T 2201/0202
See application file for complete search history.

(56) References Cited

U.S. PATENT DOCUMENTS 7,058,809 B2    6/2006 White et al. .................. 713/176
2003/0009669 A1*  1/2003 White et al. .................. 713/176
(Continued)

FOREIGN PATENT DOCUMENTS

WO    WO 2007067168    6/2007  ............... H04N 1/32

OTHER PUBLICATIONS

PCT International Search Report and Written Opinion issued in corresponding application No. PCT/EP2011/054828, dated Aug. 22, 2011 (13 pgs).
(Continued)

*Primary Examiner* — Samson Lemma
*Assistant Examiner* — Arya Golriz
(74) *Attorney, Agent, or Firm* — Marc S. Kaufman; Reed Smith LLP

(57) ABSTRACT

The invention relates to a computer-implemented method for providing a data stream comprising a plurality of content elements. At least one of two or more copies of a first content element of the data stream has been watermarked with a different watermark. The method includes watermarking at least one of two or more copies of a second content element with a different watermark. In a rendering order of the data stream, the second content element is at an interval equal to or greater than a watermark interval from the first content element. The watermark interval is set to be sufficiently long so that the output quality of the rendered data stream can either completely recover or at least return to a predetermined acceptable level following the watermarking of the copies of the first content element before watermarking the copies of the next content element.

19 Claims, 7 Drawing Sheets

(51) Int. Cl.
*H04N 21/2343* (2011.01)
*H04N 21/2389* (2011.01)
*H04N 21/44* (2011.01)
*H04N 21/8358* (2011.01)
*H04N 21/845* (2011.01)
*H04N 19/154* (2014.01)
*H04N 19/467* (2014.01)

(56) References Cited

U.S. PATENT DOCUMENTS

2004/0117629 A1* 6/2004 Koto et al. .................. 713/176
2004/0125952 A1   7/2004 Alattar et al. ............... 380/202

OTHER PUBLICATIONS

Alattar et al., "Digital Watermarking of Low Bit-Rate Advanced Simple Profile MPEG-4 Compressed Video," IEEE Transactions on Circuits and Systems for Video Technology, vol. 13, No. 8, Aug. 2003 (14 pgs).

Langelaar et al., "Watermarking Digital Image and Video Data, A State-of-the-Art Overview," IEEE Signal Processing Magazine, vol. 17, No. 5, Sep. 2000 (28 pgs).

* cited by examiner

CONTENT SEGMENTATION OF WATERMARKING

FIELD OF THE INVENTION

Generally, the invention relates to the field of content delivery to recipient devices. More specifically, the invention relates to the field of streaming-type delivery of content comprising watermarks.

BACKGROUND OF THE INVENTION

Digital watermarking is a technique that comprises adding information into a digital audio, picture or video signal in such a manner that the added information is difficult to remove and may be used to identify, prevent, or discourage unauthorized copying of digital media. A watermarking technology described in U.S. Pat. No. 7,058,809, entitled "Method and system to uniquely associate multicast content with each of multiple recipients," description and drawings of which is incorporated herein by reference in its entirety, is based on the concept of generating, at the head-end for a digital TV broadcast system, two or more differently watermarked instances for the same content element and repeating the procedure for a sequence of content elements. The content stream broadcast to recipient devices then includes differently watermarked copies for the sequence of the content elements. An example of a part of a content stream including such watermarking is shown in FIG. 1 as a content stream 100. The content stream 100 illustrates a rendering order of content elements. As explained in greater detail below, a rendering order of the content elements could be different from the order in which the content elements are broadcast by the head-end and could be different from the order in which the content elements are received and/or decoded by a recipient device.

As shown in FIG. 1, the content stream 100 includes content elements $C_1$-$C_7$. Two copies of each of the content elements $C_3$, $C_4$, and $C_5$ are watermarked with two different watermarks. Thus, a first copy of the content element $C_3$ is watermarked with a watermark $WS_{3,0}$, a second copy of the content element $C_3$ is watermarked with a watermark $WS_{3,1}$, a first copy of the content element $C_4$ is watermarked with a watermark $WS_{4,0}$, a second copy of the content element $C_4$ is watermarked with a watermark $WS_{4,1}$, a first copy of the content element $C_5$ is watermarked with a watermark $WS_{5,0}$, and a second copy of the content element $C_5$ is watermarked with a watermark $WS_{5,1}$.

All of the content elements shown in the content stream 100 are broadcast by the head-end to each of the recipient devices, although not necessarily in the same order as shown in FIG. 1. In addition to receiving the broadcast content, a particular recipient device is configured to receive (e.g. from the head-end, from the smart card within the recipient device or from some other source) selection information that provides instructions for the recipient device as to which single copy of the multiple copies of the watermarked content elements the device should select. After the recipient device selects the appropriate copies of the watermarked content elements according to the received selection information, the decoded output at the recipient device will comprise a unique sequence of watermarks. Having a unique sequence of watermarks at the decoded output content of each recipient device allows e.g. identification of source of illegal copies of the content.

SUMMARY OF THE INVENTION

It is an object of the invention to provide a method and a system for including differently watermarked copies of a plurality of content elements that can provide further improvements for the method described above.

One aspect of the invention discloses a computer-implemented method for providing a data stream comprising a plurality of content elements. Once the data stream has been encoded, at least one of two or more copies of a first content element of the data stream has been watermarked with a different watermark. The method includes watermarking at least one of two or more copies of a second content element with a different watermark. In a rendering order of the data stream, the second content element is at an interval equal to or greater than a watermark interval from the first content element, where the watermark interval comprises one or more content elements. Furthermore, in the rendering order of the data stream, none of content elements within the interval have been processed so that at least one of the two or more copies of a content element within the interval is watermarked with a different watermark. The watermark interval is set so that a degradation in the output quality of the data stream caused by watermarking of the at least one of the two or more copies of the first content element is at a predetermined level at the end of the watermark interval. The degradation follows, in the rendering order of the data stream, the at least one of two or more copies of the first content element watermarked with a different watermark. Encoding in the first content element and the second content element does not compensate for encoding changes introduced by watermarking the at least one of the two or more copies of the first content element and the at least one of the two or more copies of the second content element.

As used herein, the term "copy of a content element" is used broadly to identify any instance of a content element. The term may e.g. be used to refer to the original version of a content element. Thus, when only a single version of a content element is present, possibly the original version of the content element, that single version of the content element is referred to as a "copy" of the content element. The term may also be used to refer to any copy of the original version of the content element. Thus, when an original content element and a copy of the original content element may be present, both of these instances of the content element may be referred to as "copies" (i.e., two copies of such content element are present). Consequently, the method covers e.g. situations where the two copies of a content element include the original version of the content element and a copy of the original version of the content element.

In various embodiments, the method may further include steps of generating the two or more copies of each of the first content element and the second content element.

In another aspect of the invention, a system for carrying out steps of the method is proposed.

The invention is based on the recognition that compression of a data stream as a part of preparing the data stream for the transmission results in degradation of the output quality of the decoded output at the recipient devices if the data stream includes at least one differently watermarked copy of a content element for which two or more copies have been made. Such a degradation is illustrated in FIG. 2 in a graph below the content element 200, indicating that the graph corresponds to the output quality of the rendered content stream 200. For illustration purposes, the content stream 200 may be the same as the content stream 100 described with reference to FIG. 1. Therefore, in the interests of brevity, the description of the content stream 200 is not repeated here. The degradation in the output quality of the rendered content before and after the inclusion of the differently watermarked copies may be explained as follows.

Temporal compression of a data signal includes defining parts of a signal with a number of references to the previous parts of the signal and a number of references to the future part of the signal. Such a compression is possible because audio and video signals change over time in fairly predictable ways. As used in the present application, the terms "previous part," "future part," "order" and other terms indicating temporal order of elements in a stream or a signal are used to describe the order in which the elements are rendered (i.e., the rendering order).

When a digital decoder in a recipient device begins receiving the stream, ideally, the decoder needs to acquire all the relevant content elements that would allow resolving all of the temporal references before being able to properly render the intended output content. That is one reason why the transmission order of the content elements in a signal typically differs from the rendering order (display) of the signal. Waiting to acquire all the relevant content elements takes some time though. Therefore, alternatively, the decoder can start decoding the stream before all of the relevant content elements are received, but this may result in the output content having undefined elements because not all temporal references could be properly resolved. Different decoders could be configured to achieve a balance between quick response to an input stream and the initial quality of the decoded output that is satisfactory for particular situations. Error concealment techniques could be used to fill in the undefined parts of the signal with a reasonable estimate.

Most compressed signal formats define random access points in the stream. At these points, a decoder can actually acquire all elements that are necessary to start decoding the encoded signal from a particular point in time onwards. This means that in order to decode a particular stream, the decoder requires a number of previously decoded parts of the stream, some of which may be included in a different sequence.

When a data stream is modified by insertion of two copies of a particular content element having two different watermarks, such modifications to the content element propagate to the later and earlier elements of the rendered output stream because of the temporal references to the previous and future parts of the stream, discussed above. This situation is illustrated in FIG. 3 depicting a part of a content stream 300, shown in it's rendering order, comprising content elements $C_1$-$C_7$. As shown, two copies of the content element $C_3$ are watermarked with two different watermarks. A first copy of the content element $C_3$ is watermarked with a watermark $WS_{3,0}$ and a second copy of the content element $C_3$ is watermarked with a watermark $WS_{3,1}$. Because of the modifications to the two copies of the content element $C_3$, not all temporal references can be properly resolved at the recipient device that is instructed to select only one of these copies, which results in the degradation of the output quality of the rendered stream before and after the insertion of the watermark. The degradation after the inclusion of the watermarks is shown in FIG. 3 in a graph below the content stream 300. Similar degradation may occur before the inclusion of the watermarks in the content element $C_3$ because of the temporal references to previous parts of the signal but, for clarity reasons, it is not shown in FIG. 3.

Returning back to FIG. 2, the graph below the content stream 200 illustrates that the degradation becomes even worse when copies of a sequence of consecutive content elements are watermarked with different watermarks. This further decrease in the output quality can be attributed to the cumulative effect of the inability to resolve all the temporal references at the recipient device when the device has to select one copy of each watermarked content element.

One way to decrease or eliminate the degradation in output could be to counteract the propagation of the modifications to the content element by introducing corresponding changes to the content elements before and after the content element with differently watermarked copies. However, changes that would be required to counteract the propagation of the watermark could cover a period much longer than the duration of the watermarked content element, demanding increased processing resources in the head-end and in the recipient device.

Another way to decrease or eliminate the degradation in output could be to increase the duration of the watermarks. This situation is shown in a content stream 400 depicted in FIG. 4. The content stream 400, shown in it's rendering order, includes content elements $C_1$-$C_7$ where one copy of the sequence of content elements $C_3$-$C_5$ is watermarked with a watermark $WS_{3-5,0}$ and another copy of the sequence of content elements $C_3$-$C_5$ is watermarked with a watermark $WS_{3-5,1}$. Since content elements $C_3$-$C_5$ are watermarked with a single watermark, a sequence of these elements could be considered to be a single content element $C_{3-5}$ with a relatively long duration. The watermark symbols introduced to the content stream 400 have relatively long durations as each watermark would cover a number of content elements to make sure that any changes introduced by the watermarking process do not propagate beyond the borders of the watermarked content elements.

The approach of increasing the duration of the watermarked copies has a disadvantage of an increased bandwidth necessary for transmitting the stream as both copies of the same content portion need to be included in the broadcast. The bandwidth demand further increases when, instead of one instance, as shown in FIG. 4, a sequence of content portions need to be copied and differently watermarked to enable each of the recipient device to obtain a unique sequence of watermarks, as described in the background of the invention.

Note that the above discussion regarding two copies of a content element each being watermarked with a different watermark also holds true for situations where two copies of a content element have been made but only one of the two copies is watermarked. In such situations, the problem of not being able to resolve all temporal references may still exist because the copy of the content element without a watermark differs from the copy of the content element with a watermark and the digital receiver at the recipient device still has to select only one of these different copies. Therefore, for the purpose of the discussions in the present application, in the context of discussing two copies of a content element where one copy is watermarked and the other copy is not watermarked, the copy of the content element without a watermark could also be considered to be a "watermarked copy."

The present invention provides a technique for including differently watermarked copies of a plurality of content elements in a manner that can minimize degradation in an output quality of a data stream without significantly increasing the amount of data included in a broadcast stream and without having to implement complicated and resource-consuming changes to the content elements of the stream which are not watermarked. The proposed technique is based on setting an interval, referred to herein as a "watermark interval," as the minimum interval that, in the rendering order of the data stream, separates two different instances of content elements that include two or more copies, where, for each of these content elements, at least one copy is watermarked with a different watermark.

The watermark interval is set to be sufficiently long so that the output quality of the rendered data stream can either completely recover or at least return to a predetermined acceptable level following the watermarking of the copies of the first content element before copies of the next content element are watermarked with different watermarks. In that manner, the degradation in the output quality of the rendered data stream may be minimized in comparison with the cumulative degradation taking place when the first content element for which two or more differently watermarked copies have been made is immediately followed by the second content element for which two or more differently watermarked copies have been made.

While the method described above is particularly advantageous for situations where watermarks are inserted after the data stream has been encoded and where, as a result, encoding in the first and second content elements does not compensate for encoding changes introduced by watermarking of the copies of the first and second content elements, the method according to embodiments of the present invention does not have to be limited to only such situations.

In one embodiment, the watermark interval may be set based on prior measurements of the degradation in the output quality of the data stream caused by watermarking of the at least one of the two or more copies of the first content element. In another embodiment, the watermark interval may be set, possibly in real-time, by monitoring the output quality of the data stream following, in the rendering order of the data stream, the first content element and setting the watermark interval equal or greater to an interval when the degradation in the output quality of the data stream caused by watermarking of the at least one of the two or more copies of the first content element returns to a predetermined level.

By producing several copies of a content element, each of the copies being watermarked differently, a data structure of selection information can be created that instructs the recipient device which copy for a particular content element should be retrieved for accessing and rendering the content. The selection information enables customization of the sequences of content elements for the particular recipient device as the selection information varies for different recipient devices and each recipient device is enforced to obtain only the prescribed copies. Watermarked copies of the content elements can be stored in one or more caches of intermediate network nodes in a delivery network. The watermarked copies can be retrieved from these caches, instead of from the server and/or the head-end, when a modified content element reference is common to the selection information of multiple recipient devices, as may occur frequently.

In an embodiment where the data stream is broadcast to the plurality of recipient devices, the data stream provided to each recipient device may include all of the watermarked copies of the first content element and all of the watermarked copies of the second content element. In such an embodiment, the method may further include transmitting selection information to a particular recipient device, possibly in response to a request from that recipient device for providing the content, the selection information prescribing to the recipient device the copy to be retrieved by the recipient device for each of the content elements for which two or more watermarked copies are available.

In an embodiment where the data stream is unicast to each individual recipient device, the data stream provided to each recipient device may include only one of the watermarked copies of the first content element and only one of the watermarked copies of the second content element. The watermarked copies to be included in the data stream would be selected according to selection information for the recipient device, the selection information indicating the watermarked copy to be provided to the recipient device for each of the content elements for which two or more copies are available. This approach may also be applied where the data stream is multicast to a plurality of recipient devices, the plurality of the recipient devices being associated with the same selection information.

Selection information allows the sequence of content elements to be individualized for a particular recipient device or session with the device by enforcing selection of different particular copies with watermarks to obtain a unique combination of watermarks for that device or session. Watermarking involves the insertion of unique information into the content elements in a non-removable manner and in a manner typically not or hardly noticeable for the user at the receiving side. The unique combination of watermarks enables tracing a recipient device redistributing the content without authorization.

In an embodiment, the watermarked copies may include copies for different encoding characteristics of a content element to enable application of the invention for adaptive streaming. Adaptive streaming protocols extend the basic content streaming protocols with support for the delivery of content over a network infrastructure that has no Quality-of-Service guarantees. Copies of the same content elements with different encoding characteristics are generated. Examples of different encoding characteristics include different bit-rates and/or different spatial resolution. Copies with different encoding characteristics are also referred to as quality levels. Since each quality level (copy) consists of a sequence of time aligned content elements, a recipient device determines to request such a content element from one of several quality levels at run-time to react to varying network transmission and/or processing conditions.

Encryption can be combined with watermarking, if required.

In an embodiment, the watermark interval may be set so that the shorter the duration of the first content element, the longer the duration of the watermark interval. For example, the duration of the watermark interval may be proportional to the inverse of the duration of the first content element to any power greater than zero. As a result, the duration of the copied and watermarked content elements may be made shorter as long as sufficiently long watermark interval is provided in between such elements so that the decoded output may sufficiently recover from degradation due to the insertion of the watermarked copies of such relatively short elements. As described above, making the duration of the copied watermarked elements as short as possible is particularly beneficial, in terms of reduced required bandwidth, for when the data stream is broadcast.

Yet another aspect of the invention discloses another computer-implemented method for providing a data stream comprising a plurality of content elements, where at least one of two or more copies of a first content element of the data stream have been watermarked with a different watermark. The method includes a step of setting a watermark interval so that, in a rendering order of the data stream, none of content elements within the watermark interval immediately following the first content element have been both copied to generate two or more copies and watermarked so that at least one of the two or more copies is watermarked with a different watermark and so that a degradation in the output quality of the data stream caused by watermarking of the at least one of the two or more copies of the first content element is at a predetermined level at the end of the watermark interval. The method also includes steps of selecting a second content element that is, within the rendering order of the data stream, at an interval equal to or greater than the set watermark interval from the first content element and watermarking at least one of two or more copies of the second content element with a different watermark. In this manner, content may be provided in a manner that may reduce the required bandwidth and decrease degradation in an output quality of the data stream due to insertion of watermarks into copies of the content elements.

Still other aspects of the invention relate to a, preferably non-transitory, computer program for carrying out steps of one or more of the methods described above, to a data structure representing the selection information as described herein and to a client device configured for processing such a data structure.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
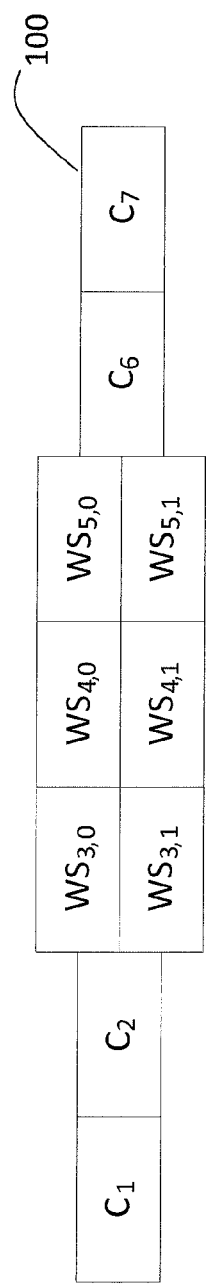
FIG. 1 is a schematic illustration of a content stream comprising watermarked copies of three consecutive content elements.
Figure 2:
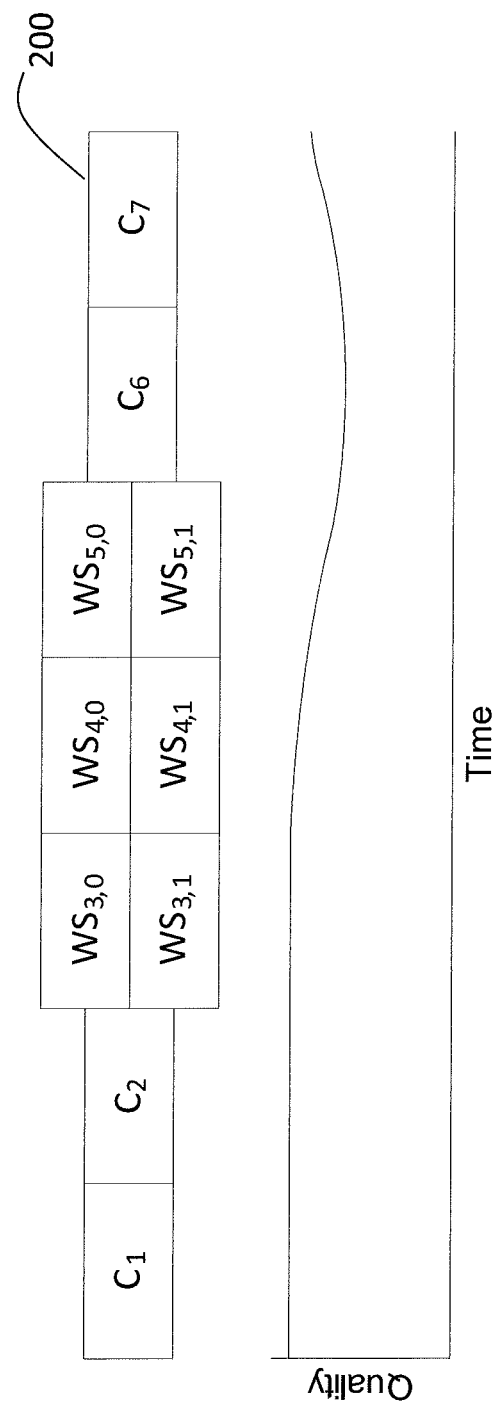
FIG. 2 schematically illustrates a content stream and the associated quality of the rendered output of the content stream comprising watermarked copies of three consecutive content elements.
Figure 3:
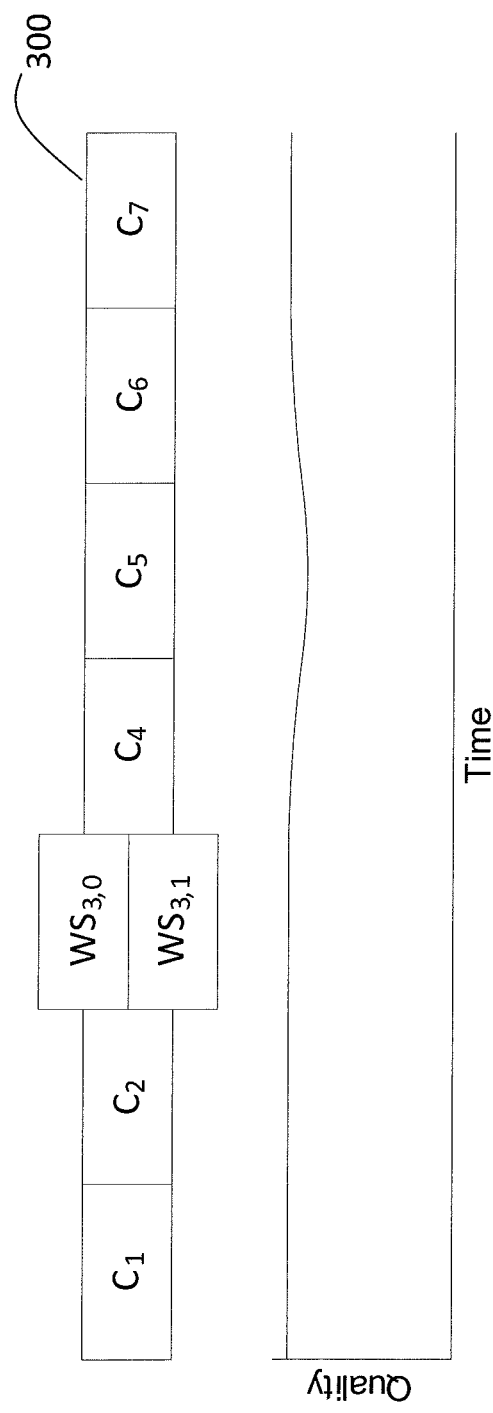
FIG. 3 schematically illustrates a content stream and the associated quality of the rendered output of the content stream comprising watermarked copies of a short content element.
Figure 4:
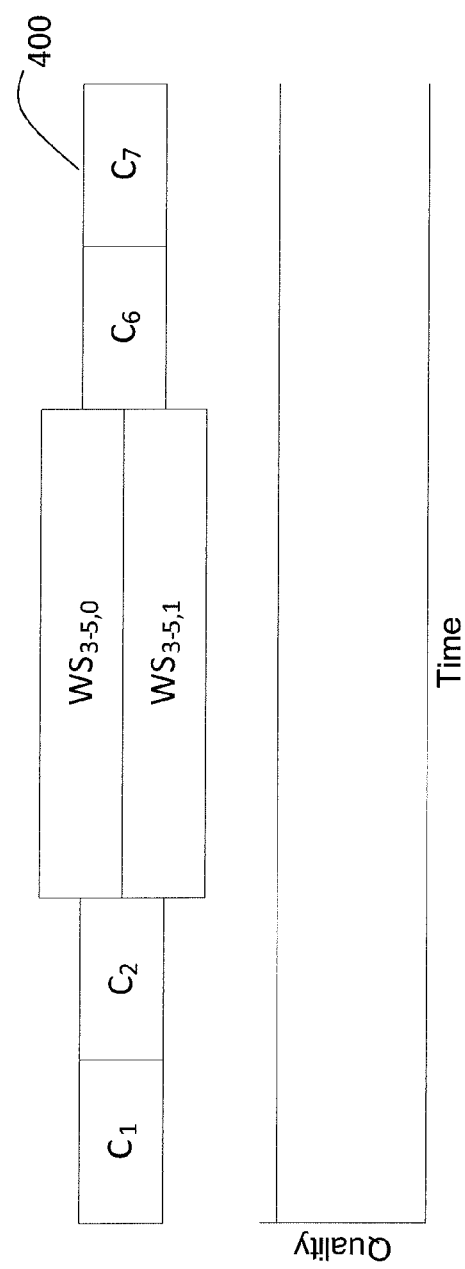
FIG. 4 schematically illustrates a content stream and the associated quality of the rendered output of the content stream comprising watermarked copies of a long content element.
Figure 5:
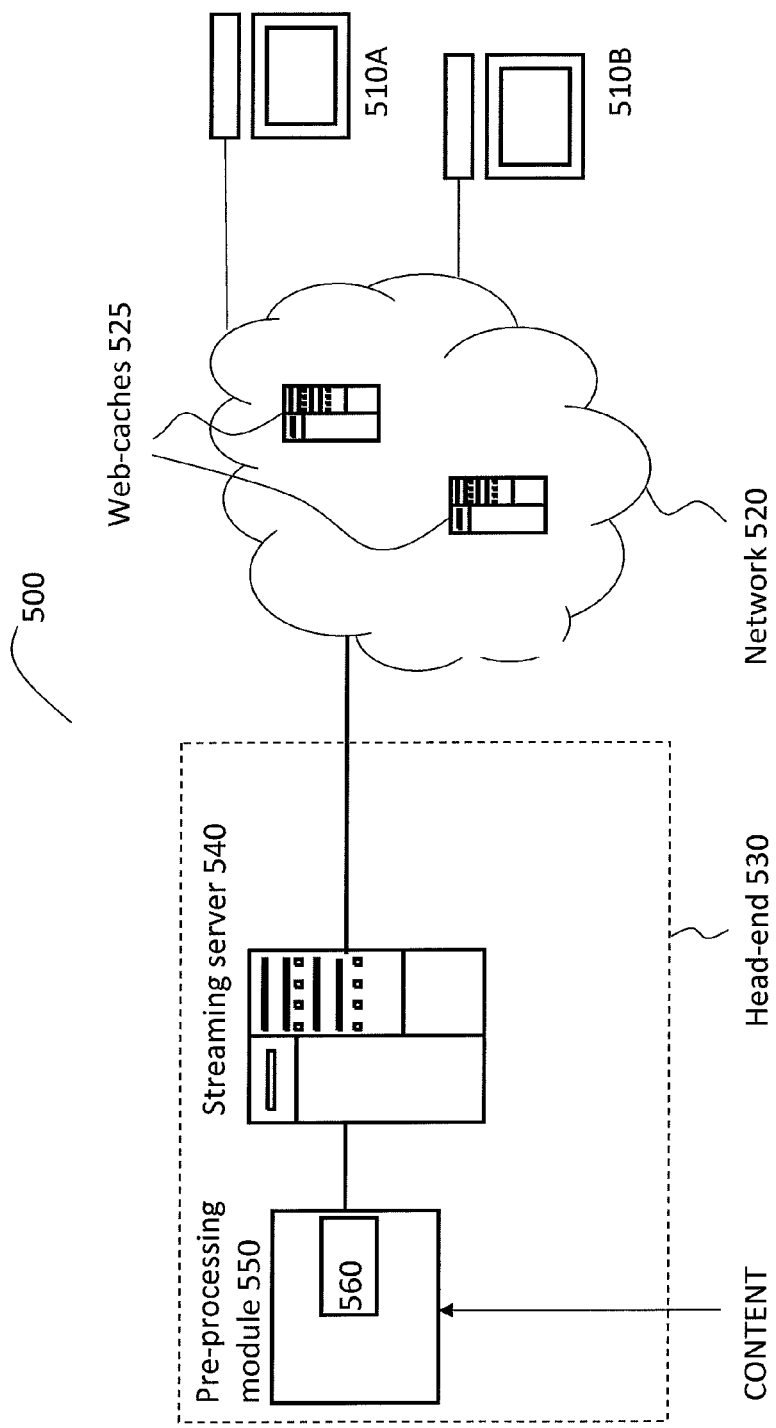
FIG. 5 is a schematic illustration of a content delivery infrastructure according to an embodiment of the invention.

FIG. 5 is an illustration of a content delivery infrastructure 500 for providing content to a particular recipient device 510A of a plurality of recipient devices 510A, 510B over a network 520 according to an embodiment of the invention. Network 520 may e.g. represent the internet. The network 520 may, optionally, comprise one or more network nodes 525 containing caches for storing data.

The infrastructure 500 employs a head-end 530 comprising a streaming server 540 receiving input from a pre-processing module 550. Streaming server 540 may comprise or be associated with storage for storing content elements, which could be external to the head-end 530. The streaming server 540 may represent a system of servers, each of the servers being located near a subset of recipient devices. Thus, various parts of the head-end 530 may be geographically distributed.

The pre-processing module 550 comprises an input for receiving clear content and comprises a content modifier 560 for modifying content elements by e.g. including watermarks. The output of the pre-processing module 550 is connected to the input of the streaming server 540. The below-described operations may be performed in one or more pre-processing modules 550 of the head-end 530.

The operation of the system is now described in further detail with reference to FIGS. 6 and 7.

Figure 6:
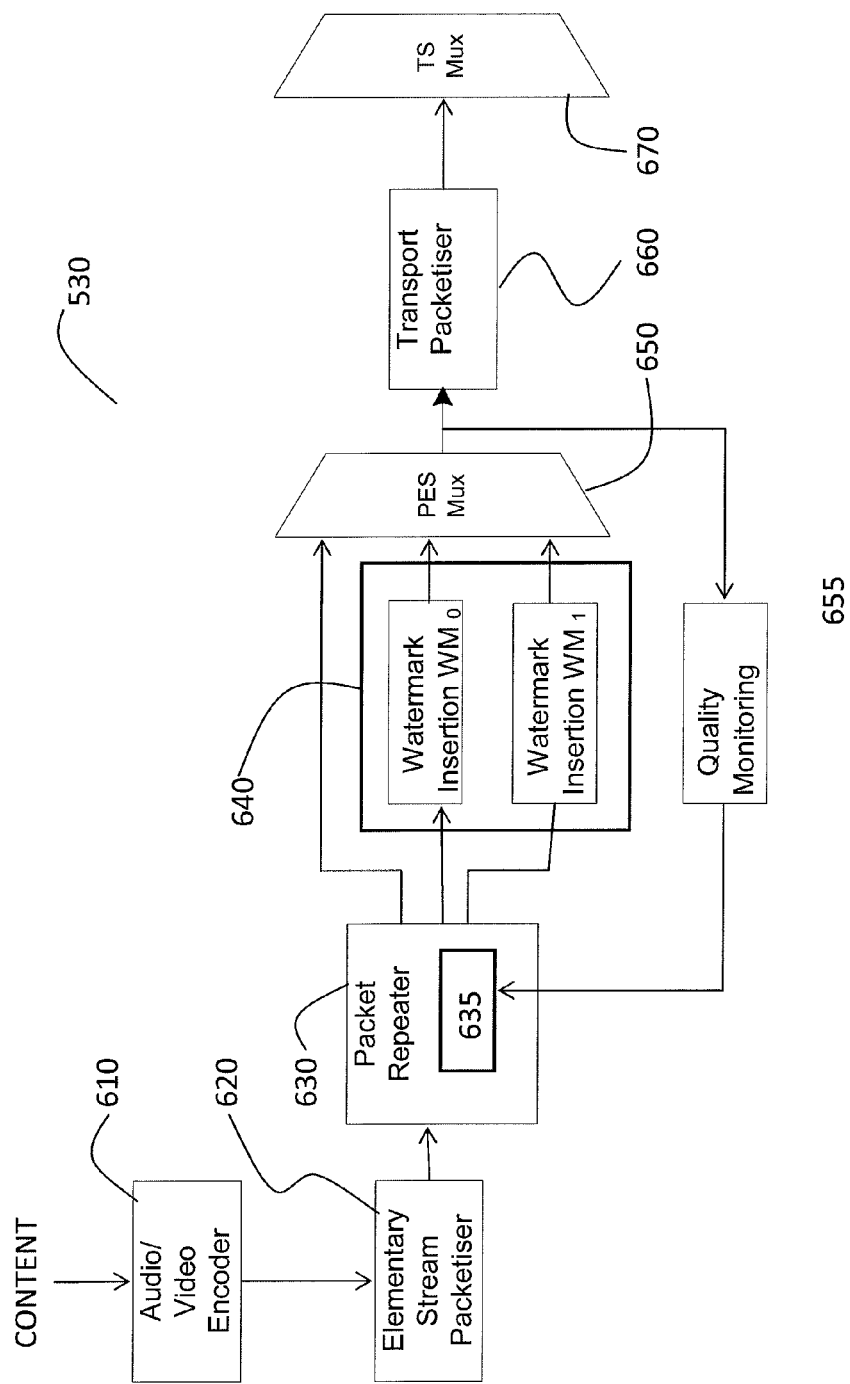
FIG. 6 is a schematic illustration of a head-end system of the content delivery structure of FIG. 5 according to an embodiment of the invention.

FIG. 6 is a schematic illustration of the head-end system 530 according to an embodiment of the invention. The head-end system 530 could e.g. comprise a head-end for a digital TV broadcast system.

As shown in FIG. 6, clear content is first provided to an audio/video encoder 610 which generates one or more of encoded audio and/or video streams. The encoded streams are then provided to an elementary stream packetiser 620 configured to packetize the streams into content elements (PES packets). The packetized encoded streams are then provided to a packet repeater 630.

For some or all of individual data streams arriving at the packet repeater 630, the packet repeater 630 is configured to select and generate two or more copies of particular content elements.

The two or more copies of these content elements then proceed to a watermarking module 640, which could comprise one or more individual modules each configured to provide a different watermark, configured to insert watermarks into the two or more copies of the copied content elements. In this manner, the head-end 530 inserts two differently watermarked instances of the same content element into the stream.

As shown in FIG. 6, the PES multiplexer 650 is configured to receive content elements that have not been copied and/or watermarked as well as the watermarked content elements and multiplex them into a single stream of data which is then processed by a transport packetiser 660 and a transmission multiplexor 650 in a manner known in the art for transmitting content.

In order to create a broadcast stream where the differently watermarked copies of a content element are both bandwidth efficient and have minimal impact on the distortion in the decoded output, the head-end 530 creates a data stream where differently watermarked copies of one content element and differently watermarked copies of another content element are separated by a certain distance in time (in the rendering order of the stream), a watermark interval. An example of such a stream is illustrated in FIG. 7.

Figure 7:
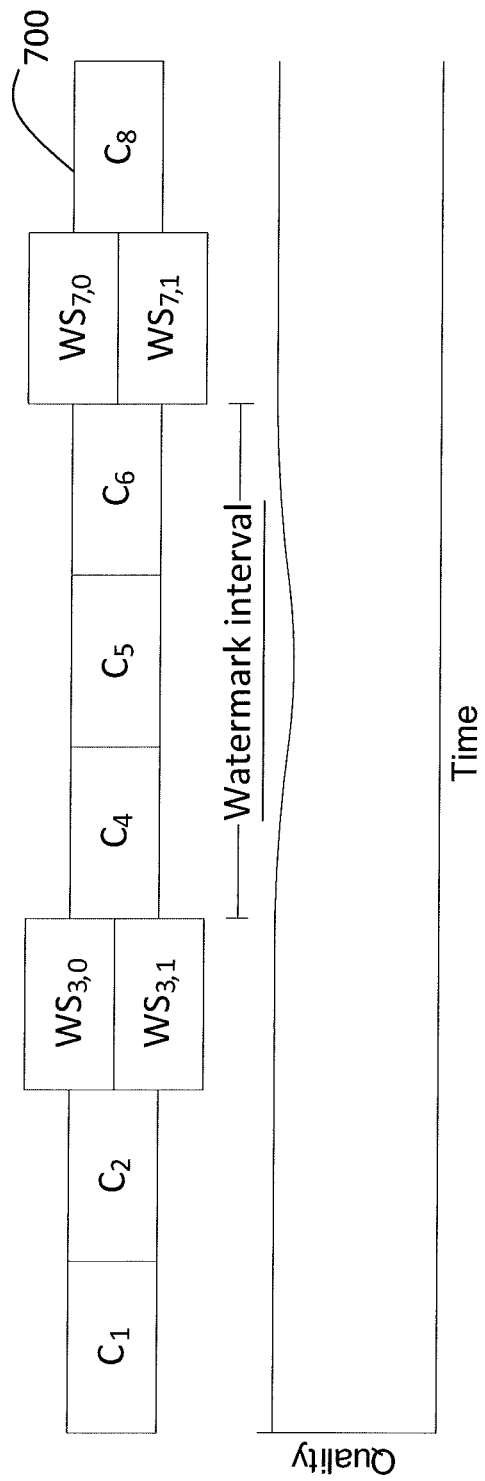
FIG. 7 is a schematic illustration of a watermark interval in a content stream comprising watermarked copies of two content elements according to an embodiment of the invention.

As shown in FIG. 7, the content stream 700, shown in it's rendering order, includes content elements $C_1$-$C_8$. For each of two different content elements of the content stream 700, two copies have been generated by the packet repeater 630 and watermarked with different watermarks by the watermarking module 640. The first such content element is the content element $C_3$, for which a first copy is watermarked with a watermark $WS_{3,0}$ and a second copy is watermarked with a watermark $WS_{3,1}$. The second such content element is the content element $C_7$, for which a first copy is watermarked with a watermark $WS_{7,0}$ and a second copy is watermarked with a watermark $WS_{7,1}$.

As shown in FIG. 7, the content elements $C_3$ and $C_7$ are separated by an interval in which content elements are not processed as to result in the presence of two or more copies of content elements watermarked with different watermarks. Thus, content elements $C_4$, $C_5$, and $C_6$ exist only in a single copy which may or may not be watermarked. The minimum value of an interval separating the content elements $C_3$ and $C_7$, a watermark interval, is selected to be of such duration that, during the watermark interval, the output quality of the rendered content stream can either completely recovered from degradation caused by the creation of two differently watermarked copies of the content element $C_3$ or can at least recover to a particular predetermined level which has been established as a satisfactory quality level. The interval between content elements in the rendering order of the stream 700 may be measured in the units of time, in the number of content elements or using some other counter that corresponds to the time between the content elements in the rendering order of the content stream.

FIG. 7 illustrates that, after the watermarking interval, the content decoding process has recovered from the watermark distortion as indicated by the quality level that has returned to the output quality that was present before the insertion of the watermarks into copies of the content element $C_3$. As explained previously herein, degradation in the output quality may occur due to the changes in the content encoding of some content elements that the other content elements are not taking into account and the degradation becomes worse for the watermarked copies having shorter duration. Separating the content elements for which two or more copies have been made and differently watermarked sufficiently far apart allows using watermarks of shorter duration because the presence of the watermark interval between the first content element and the second content element allows the output quality of the stream to recover from the increase degradation caused by the short watermarks inserted into these content elements. Using watermarks of a shorter duration, in turn, allows minimizing bandwidth requirements for transmission of the broadcast stream.

The head-end 530 illustrated in FIG. 6 includes a watermark interval unit 635, which could be included in e.g. a packet repeater 630, configured to set a watermark interval between different content elements for which the packet repeater generates two or more copies, at least one of which is then subsequently watermarked by the watermarking module 640.

In an embodiment, the watermark interval unit 635 may be implicit when the packet repeater 630 and/or the watermarking module 640 are pre-configured to use a watermark interval of sufficient duration to allow any content decoder to recover from the propagation of the watermark encoding possibly impacting the output quality of other content elements.

In one embodiment, the watermark interval may be set based on prior measurements of the watermark propagation effects on the quality of the decoded output stream.

In another embodiment, the watermark interval may be set to be dependent on the duration of the watermarks in the two or more watermarked copies of the content elements. In such an embodiment, the duration of the watermark interval could be set to be inversely proportional to the duration of the watermarked copies. Such a dependency does not necessarily have to be linear but could be any kind of dependency where the shorter the duration of the watermarked copies, the longer the watermark interval.

In yet another embodiment, the watermark interval may be set based on monitoring of the decoded output quality. To that end, as shown In FIG. 6, the head-end 530 may further include a quality monitoring unit 655 configured to analyze the decoded output of the generated content streams. The quality monitoring unit 655 may provide the quality level information to the watermark interval unit 635 which, in turn, may control the watermark interval between two watermarked copies in the content stream.

In some applications it may be desirable to increase the watermark symbol rate, which would benefit from a dynamically changing watermark interval. The quality monitoring unit 655 may then analyze the quality of the decoded output of the generated content streams and provide the results to the watermark interval unit 635 configured to use the results to dynamically control the watermark interval.

In an embodiment, the quality monitoring unit 655 may be configured to monitor decoded output quality in real time where the measured quality drives the variable time distance between the content elements for which two or more copies are differently watermarked.

In various embodiments, content elements between the content elements for which two or more copies have been watermarked could be watermarked as well. For example, the watermark interval can be used for the (earlier) insertion and transmission of a "service watermark" or some other common watermark. Establishing relatively long intervals between content elements for which two or more copies are watermarked with different watermarks and inserting a common watermark in these intervals ensures that the two watermarking schemes have a minimal impact on one other.

One or more of the modules illustrated in FIG. 6 may be included within the one or more pre-processing modules 550, which, in turn, may or may not be part of the streaming server 540. Some or all of the content, including the watermarked copies may be stored in the storage accessible to the streaming server 540.

Embodiments described herein are suitable for preparing and transmitting data streams from the head-end using broadcast, unicast or multicast transmission. In case where the data stream will be broadcast, the data stream would include all of the differently watermarked copies of the content elements. Thus, in the example illustrated in FIG. 7, the data stream 700 as broadcast to the plurality of recipient devices would include content elements $C_1$, $C_2$, $C_3$ watermarked with $WS_{3,0}$, $C_3$ watermarked with $WS_{3,1}$, $C_4$, $C_5$, $C_6$, $C_7$ watermarked with $WS_{7,0}$, $C_7$ watermarked with $WS_{7,1}$, and $C_8$. A particular recipient device would have selection information available, e.g. in a form of a data structure, where the selection information enforces the recipient device to retrieve a customized set of watermarked content elements of streaming content to be rendered by the recipient device. For example, the selection information for one recipient device could indicate that the device should select $C_3$ watermarked with $WS_{3,0}$ and $C_7$ watermarked with $WS_{7,1}$. The selection information could be made available to the recipient device by being transmitted by the head-end 530 or some other source, by being stored in the recipient device or by being obtained in some other manner.

In case where the data stream will be unicast to each individual recipient device or multicast to a group of recipient devices, the data stream would include one copy of each content element for which two or more differently watermarked copies have been made by the head-end 530. In such an embodiment, the selection of the appropriate copy for a particular recipient device would be performed before the data stream is transmitted to the device. Such a selection could also be performed based on the selection information described above. Thus, in the example illustrated in FIG. 7, the data stream 700 as broadcast to a particular recipient device could include content elements $C_1$, $C_2$, $C_3$ watermarked with $WS_{3,0}$, $C_4$, $C_5$, $C_6$, $C_7$ watermarked with $WS_{7,1}$, and $C_8$.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state nonvolatile semiconductor memory) on which information is permanently stored; and (ii) writable storage media (e.g., floppy disks within a diskette drive or hard-disk drive or any type of solid-state random-access semiconductor memory) on which alterable information is stored. The computer program may be run on a processor in the head-end 530, preferably in the streaming server 540.

The invention claimed is:

1. A computer-implemented method for providing a watermarked version of a data stream, wherein the data stream comprises comprising a plurality of content elements, wherein, of a first content element of the data stream has been processed to form two or more differently watermarked copies of the first content element, wherein the watermarked version of the data stream comprises at least one of the two or more differently watermarked copies of the first content element watermarked with a different watermark, the method comprising:
   Processing, by a computer processor, a second content element of the data stream to form two or more differently watermarked copies of the second content element, wherein:
   in a rendering order of the data stream, the second content element is at an interval equal to or greater than a watermark interval from the first content element;
   in the rendering order of the data stream, none of the content elements within the watermark interval have been processed so as to form two or more differently watermarked copies of that content element;
   the watermark interval comprises one or more content elements in the rendering order of the content elements of the data stream and the watermark interval is set so that said processing of the first content element causes a degradation of at most a predetermined level in output quality of the watermarked version of the data stream at the end of the watermark interval following the at least one of the differently watermarked copies of the first content element in the watermarked version; and,
   the watermarked version of the data stream further comprises at least the content elements within the watermark interval and at least one of the two or more differently watermarked copies of the second content element.

2. The method according to claim 1, wherein the watermark interval is set based on prior measurements of the degradation in the output quality.

3. The method according to claim 1, wherein the watermark interval is set by monitoring the output quality.

4. The method according to claim 3, wherein the monitoring is performed in real-time.

5. The method according to claim 1, wherein the watermarked version of the data stream provided to a recipient device comprises all of the two or more differently watermarked copies of the first content element and all of the two or more differently watermarked copies of the second content element, the method further comprising providing selection information to the recipient device, the selection information prescribing to the recipient device the copy to be retrieved by the recipient device for each of the content elements for which two or more copies are available.

6. The method according to claim 1, wherein the watermarked version of the data stream provided to a recipient device comprises one of the two or more differently watermarked copies of the first content element and one of the two or more differently watermarked copies of the second content element, the copies selected according to selection information for the recipient device, the selection information prescribing the copy to be provided to the recipient device for each of the content elements for which two or more copies are available.

7. The method of claim 1, wherein the data stream is encoded according to a data compression encoding.

8. The method according to claim 1, wherein the watermark interval is set so that the shorter the duration of the first content element, the longer the duration of the watermark interval.

9. A system for providing a watermarked version of a data stream, wherein the data stream comprises a plurality of content elements, wherein a first content element of the data stream has been processed to form two or more differently watermarked copies of the first content element, wherein the watermarked version of the data stream comprises at least one of the two or more differently watermarked copies of the first content element, the system comprising a processor arranged to:
   process a second content element of the data stream to form two or more differently watermarked copies of the second content element, wherein:
   in a rendering order of the data stream, the second content element is at an interval equal to or greater than a watermark interval from the first content element;
   in the rendering order of the data stream, none of the content elements within the watermark interval have been processed so as to form two or more differently watermarked copies of that content element;
   the watermark interval comprises one or more content elements in the rendering order of the content elements of the data stream and the watermark interval is set so that said processing of the first content element causes a degradation of at most a predetermined level in output quality of the watermarked version of the data stream at the end of the watermark interval following the at least one of the differently watermarked copies of the first content element in the watermarked version; and
   the watermarked version of the data stream further comprises at least the content elements within the watermark interval and at least one of the two or more differently watermarked copies of the second content element.

10. The system according to claim 9, wherein the watermark interval is set based on prior measurements of the degradation in the output quality.

11. The system according to claim 9, wherein the processor is further arranged to monitor the output quality and to set the watermark interval based on the output quality.

12. The system according to claim 11, wherein the monitoring is performed real-time.

13. The system according to claim 9, wherein the watermark interval is set so that the shorter the duration of the first content element, the longer the duration of the watermark interval.

14. The system according to claim 9, wherein:
   either the watermarked version of the data stream provided to a recipient device comprises all of the two or more differently watermarked copies of the first content element and all of the two or more differently watermarked copies of the second content element, the processor further arranged to provide selection information to the recipient device, the selection information prescribing to the recipient device the copy to be retrieved by the recipient device for each of the content elements for which two or more copies are available; or the watermarked version of the data stream provided to a recipient device comprises one of the two or more differently watermarked copies of the first content element and one of the two or more differently watermarked copies of the second content element, the processor further arranged to select copies according to selection information for the recipient device, the selection information prescribing the copy to be provided to the recipient device for each of the content elements for which two or more copies are available.

15. A nontransient computer readable medium having stored thereon software code portions configured for, when executed by a processor, performing the steps of a method for providing a watermarked version of a data stream, wherein the data stream comprises a plurality of content elements, wherein a first content element of the data stream has been processed to form two or more differently watermarked copies of the first content element, wherein the watermarked version of the data stream comprises at least one of the two or more differently watermarked copies of the first content element, the method comprising:

processing a second content element of the data stream to form two or more differently watermarked copies of the second content element, wherein:

in a rendering order of the data stream, the second content element is at an interval equal to or greater than a watermark interval from the first content element;

in the rendering order of the data stream, none of the content elements within the watermark interval have been processed so as to form two or more differently watermarked copies of that content element;

the watermark interval comprises one or more content elements in the rendering order of the content elements of the data stream and the watermark interval is set so that said processing of the first content element causes a degradation of at most a predetermined level in output quality of the watermarked version of the data stream at the end of the watermark interval following the at least one of the differently watermarked copies of the first content element in the watermarked version; and the watermarked version of the data stream further comprises at least the content elements within the watermark interval and at least one of the two or more differently watermarked copies of the second content element.

16. The method according to claim 7, wherein the copies comprise copies for different encoding characteristics of a content element in order to provide the content using an adaptive streaming protocol.

17. The method of claim 1, comprising encoding the watermarked version of the data stream according to a data compression encoding.

18. The method according to claim 1 wherein one of the two or more differently watermarked copies of the first content element is the first content element of the data stream prior to processing the first content element.

19. The method according to claim 1 wherein one of the two or more differently watermarked copies of the second content element is the second content element of the data stream prior to processing the second content element.

* * * * *